(12) United States Patent
Lunin

(10) Patent No.: US 7,861,411 B2
(45) Date of Patent: Jan. 4, 2011

(54) COMPOSITE GEAR AND METHOD OF FORMING SAME

(75) Inventor: Stepan V Lunin, Irvine, CA (US)

(73) Assignee: The Boeing Company, Chicago, IL (US)

( * ) Notice: Subject to any disclaimer, the term of this patent is extended or adjusted under 35 U.S.C. 154(b) by 916 days.

(21) Appl. No.: 11/743,292

(22) Filed: May 2, 2007

(65) Prior Publication Data

US 2008/0271317 A1 Nov. 6, 2008

(51) Int. Cl.
*B21D 53/28* (2006.01)
*B23P 11/02* (2006.01)
*F16H 55/08* (2006.01)

(52) U.S. Cl. .................. 29/893.37; 29/893; 29/446; 74/457

(58) Field of Classification Search ............... 29/893.37, 29/893.33, 893.34, 893.3, 893.2, 446, 449, 29/450; 74/412 R, 415, 457, 468
See application file for complete search history.

(56) References Cited

U.S. PATENT DOCUMENTS 5,875,693 A 3/1999 Zurbuchen et al.

2008/0032851 A1 2/2008 Mordukhovich

FOREIGN PATENT DOCUMENTS

| CN | 1050698 | 10/1989 |
|---|---|---|
| CN | 1098981 | 7/1994 |
| DE | 2922639 | 6/1979 |
| JP | 3092269 | 4/1991 |
| SU | 941009 | 10/1980 |
| WO | WO 01/64570 | 9/2001 |

*Primary Examiner*—David P Bryant
*Assistant Examiner*—Alexander P Taousakis
(74) *Attorney, Agent, or Firm*—Harness, Dickey & Pierce, P.L.C.

(57) ABSTRACT

A composite gear and method of making same. In one embodiment the gear includes a body portion having a plurality of teeth. The gear is formed by placing it in a suitable tool such that a compressive stress is exerted on the teeth adjacent the root portion of each tooth. A portion of the gear adjacent the teeth is wrapped with a resin fibrous material that is allowed to cure while the compressive stress is maintained on the gear. When the resin fibrous material has at least substantially cured and the gear is removed from the tool, a permanent compressive stress is formed at the root portion adjacent each tooth. The compressive stress counteracts the tension stress that is experienced at the root portions of the teeth when the gear is in use, thus significantly strengthening (i.e., toughening) the gear and increasing its fatigue life.

18 Claims, 6 Drawing Sheets

COMPOSITE GEAR AND METHOD OF FORMING SAME

STATEMENT OF U.S. GOVERNMENT RIGHTS

The subject matter of the present application was developed pursuant to Contract Number MDA972-03-9-0004 with the Defense Advanced Research Projects Agency (DARPA) of the U.S. Department of Defense. The U.S. Government has certain rights in the subject matter of the present disclosure.

FIELD

The present disclosure relates to gears and methods of making gears, and more particularly to a gear that is formed with a method that introduces a compressive stress at a root area of each tooth of the gear, to significantly toughen the gear by improving fatigue resistance.

BACKGROUND

The statements in this section merely provide background information related to the present disclosure and may not constitute prior art.

When a gear breaks, often times it is from cracking at the root of a tooth. The area of the root bears the highest stress concentration because it experiences the highest tension stress when its adjacent tooth (or teeth) is/are bearing a load.

To compensate for the significant tension stress that can be experienced at the root area of a gear tooth, designers have often used additional material to make the gear more robust. However, the inclusion of additional material that serves to strengthen the root area of the gear has drawbacks. For one, it increases the overall weight of the gear. In many applications, for example in aircraft and aerospace applications, minimizing the weight of all parts used is an important consideration. Additional weight reduces the payload that an aircraft or aerospace vehicle can carry, or alternatively increases the fuel required to power the aircraft or aerospace vehicle for a given trip or mission. Therefore, there is a significant interest in minimizing the weight of every component that is used, but without compromising the strength or durability of the component.

SUMMARY

The present disclosure is directed to a composite gear and a method of forming such a gear. In one exemplary method of forming, a gear having a plurality of teeth, and a root portion associated with each tooth, is compressed during a manufacturing operation. The compression force is applied such that it is directed radially inwardly towards an axial center of the gear. This introduces a compression stress at the root area of each tooth of the gear. While the compression force is being applied, a resin fibrous material is wrapped around a circumferential portion of the gear. The compression force is maintained while the resin cures. When cured, the compression force may be removed and the resin fibrous material operates to maintain the compression stress being exerted at the root area of each tooth of the gear. When the gear teeth are loaded during use of the gear, the tension stresses experienced at the root portions of the teeth are offset by the compression stress that was performed in the gear during its manufacture. This adds significant strength to the teeth of the gear by improving fatigue resistance and, more particularly significantly strengthens (i.e., "toughens") the root area adjacent each tooth.

An additional benefit of the above described method is that a lesser degree of metallic material may be employed in making the gear, since the overall tension stress is reduced by the resin fibrous material. This enables a lighter weight gear to be formed for a gear having a given level of strength.

In one embodiment a composite gear is disclosed. The gear includes a resin fibrous material that is wrapped over a circumferential portion of the gear adjacent the teeth while a compressive stress is being exerted on the root areas of each of the teeth. The resin fibrous material introduces a permanent compressive stress into the root areas of the teeth. In one specific embodiment the gear has teeth that project radially inwardly toward an axial center of the gear, and the resin fibrous material is wrapped around a surface of the gear that is axially aligned with the teeth. In another embodiment the gear has teeth that project radially outwardly away from the axial center of the gear, and the resin fibrous material is wrapped around a circumferential surface of the gear that is axially offset from the teeth of the gear. In another specific embodiment the resin fibrous material is wrapped around a pair of circumferential surfaces that are adjacent to, but axially offset from, the teeth of the gear.

In each construction of the gear the compressive stress introduced during the manufacturing operation serves to introduce a significant compressive stress that helps to counteract the tension stress experienced at the root area of each tooth when the gear is loaded.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application or uses.

Figure 1:
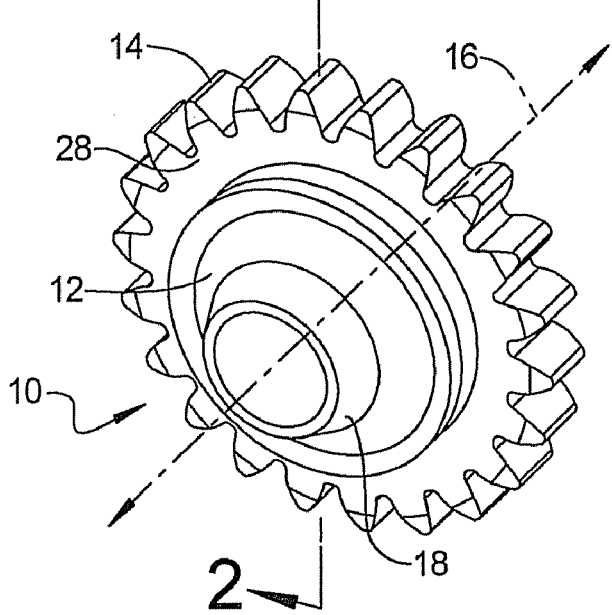
FIG. 1 is a perspective view of an exemplary gear made in accordance with the present disclosure.
Figure 2:
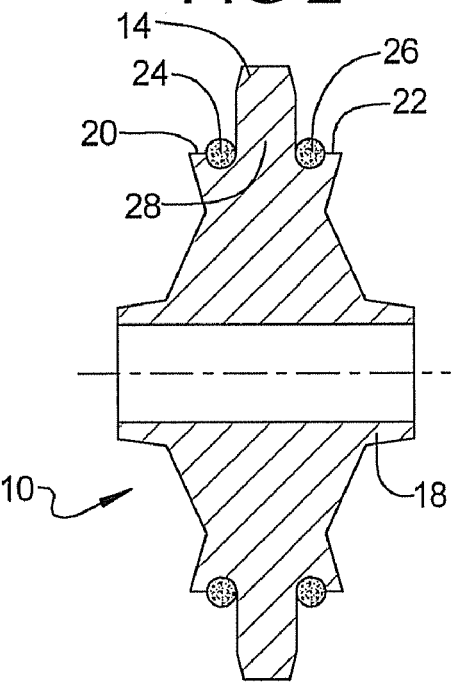
FIG. 2 is a cross sectional side view of the gear of FIG. 1 taken in accordance with section line 2-2 in FIG. 1.

Referring to FIGS. 1 and 2, there is shown a gear 10 in accordance with one embodiment of the present disclosure. The gear 10, in this example, is a ring gear having a base portion 12 with a plurality of teeth 14 integrally formed with the base portion 12 and extending radially outwardly away from an axial center 16 of the gear 10. The base portion 12 includes a hub 18 for allowing the gear 10 to be mounted on an external component, for example on a shaft. The base portion 12 also includes a pair of spaced apart, circumferential grooves 20 and 22 (FIG. 2) formed on opposite sides of the teeth 14. The grooves 20 and 22 have wrapped therein fibrous, resin impregnated material layers 24 and 26, respectively (hereinafter referred to simply as "resin fibrous material layers"). As will be explained in greater detail in the following paragraphs, the resin fibrous material layers 24 and 26 essentially form "hoops" or "rings" that serve to apply a compressive stress, also known in the art as a "hoop stress", at a root area 28 adjacent each tooth 14. This serves to counteract the tension stress at the root area 28 that the gear 10 experiences when the teeth 14 are loaded during use of the gear 10. The result is that the teeth 14 are significantly stronger and significantly more resistant to fatigue breakage than what would be case without the induced compressive stress at the root areas 28.

In one embodiment the base portion 12 of the gear 10, as well as the teeth 14, may be made from a metallic material such as steel or any other material suitable for different gear applications, for example metal alloys, ceramics or plastics. The resin fibrous material layers 24 and 26 may be made from a fibrous material including glass fibers, KEVLAR® fibers, boron fibers, carbon fibers or any other suitable fiber that is able to be coated with resin. The thickness and/or diameter of the fibrous material layers 24 and 26 will be dictated by the design of the gear 10, its dimensions, and the application in which the gear will be used. In many applications, however, it is anticipated that the thickness or diameter of each of the resin fibrous material layers 24 and 26 will range from about 0.05 inch-0.5 inch (1.27 mm-12.7 mm).

Figure 2A:
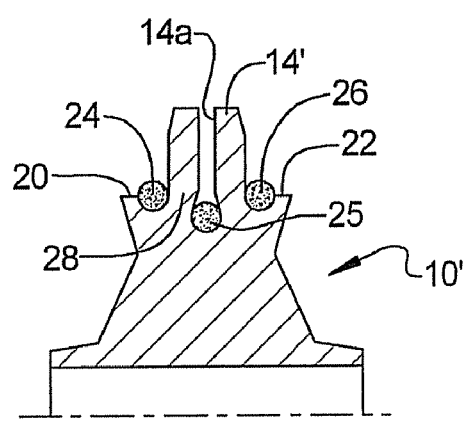
FIG. 2A show a cross-sectional view of a portion of a gear in which a radial slot has been formed in the teeth, with an additional resin fibrous material layer being wound in the radial slot.

Referring briefly to FIG. 2A, a gear 10' is shown which is modified from gear 10 by the addition of a radial slot 14a formed at an axial mid-point of the teeth 14'. An additional resin fibrous material layer 25 is wound in the slot 14a. Thus, it will be appreciated that even for gears having radially outwardly projecting teeth, it is possible to wind a resin fibrous material layer at an axial midpoint of the teeth of the gear.

Figure 3:
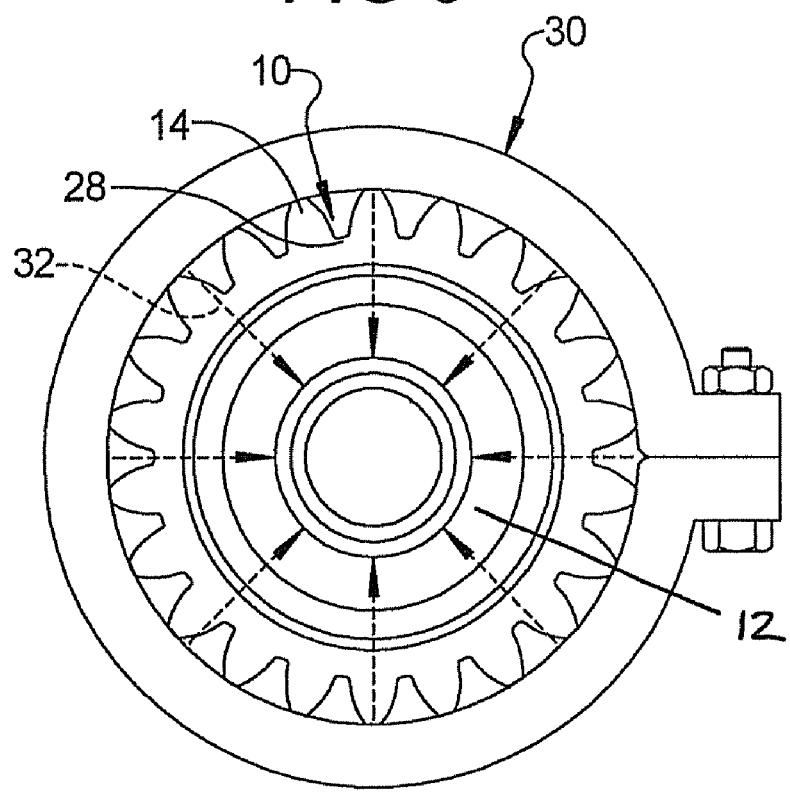
FIG. 3 is a front view of the gear of FIG. 2 being compressed just prior to laying the resin fibrous material into the groove of the gear adjacent the teeth, with the dashed arrows indicating the radially inwardly directed compression force being exerted on the gear by a tool fixture in which the gear is placed.
Figure 3A:
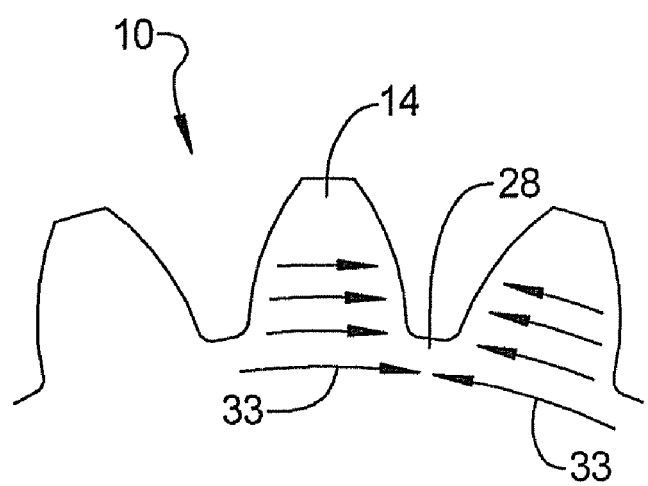
FIG. 3A illustrates a portion of the gear of FIG. 1 with arrows showing the magnitude and direction of the compression stress that is imparted at the root area of each tooth.

Referring to FIGS. 3 and 3A, during its manufacture the gear 10 is formed by placing the base portion 12 within a collet 30 or other tool that is able to apply a generally uniform, radially inwardly directed compressive force to the teeth 14. The radially inwardly directed compressive force is indicated by arrows 32 in FIG. 3. This radially inwardly directed compressive force produces tangentially directed compressive stress, as indicated by dashed arrows 33 in FIG. 3A, at the root area 28 adjacent each tooth 14. While the compressive stress is being applied to the gear 10 by the collet 30, the resin fibrous material that will form material layers 24 and 26 is wrapped into the grooves 20 and 22 on both sides of the teeth 14. In this regard, it will be appreciated that the construction of the collet 30 is such that it does not interfere with access to the grooves 20 and 22.

Once the resin fibrous material layers 24 and 26 are fully formed in their respective grooves 20 and 22, the compressive stress being exerted by the collet 30 is maintained for a time sufficient to enable the resin of the resin fibrous material layers 24 and 26 to at least substantially cure. Typically between about 2 hours-12 hours time will be required for this curing period depending on the specific resin employed. The curing time can be reduced significantly by increasing the ambient temperature in the immediate vicinity of the gear 10 to between about 100° F.-200° F. (38°-93° Celsius). When the resin has substantially cured, the gear 10 can be removed from the collet 30. The radially inwardly directed compressive stress, which may also be termed a "hoop" stress, is permanently formed in the gear 10 at the root areas 28. A further small degree of curing typically will occur after the gear 10 is removed from the collet 30.

With further brief reference to FIG. 3A, it will be noted that certain ones of arrows 33 are longer than the others. This is meant to denote the gradual increase in the compression stress from the bottom area of the tooth 14 to the root portion 28. The required amount of compressive stress that should be applied to the gear 10 will vary with the dimensions of the gear, the materials used in its construction, and also the application that the gear 10 is expected to be used in. It is anticipated that in many applications, a compressive stress equivalent to about 60% of the yield stress of the material used to form the base portion 12 may need to be imparted to the gear 10 during its manufacture in order to adequately counteract the tension stress that the root portions 28 will experience during use of the gear.

Figure 4:
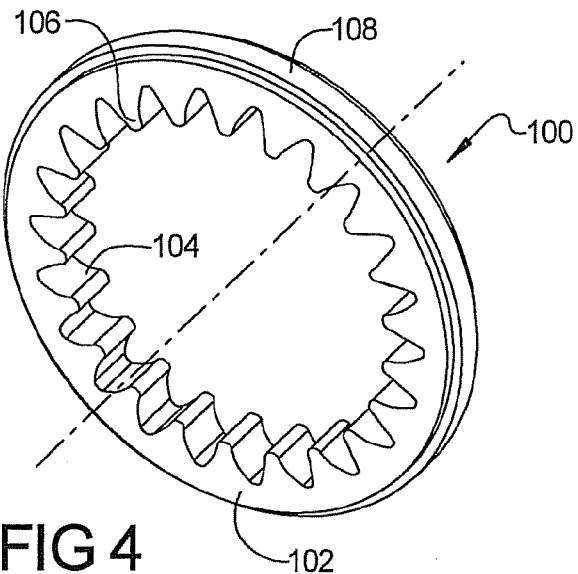
FIG. 4 is a perspective view of another embodiment of the gear of the present disclosure showing a ring gear having teeth formed on its inner diameter, with the other surface of the gear wrapped in resin fibrous material.
Figure 5:
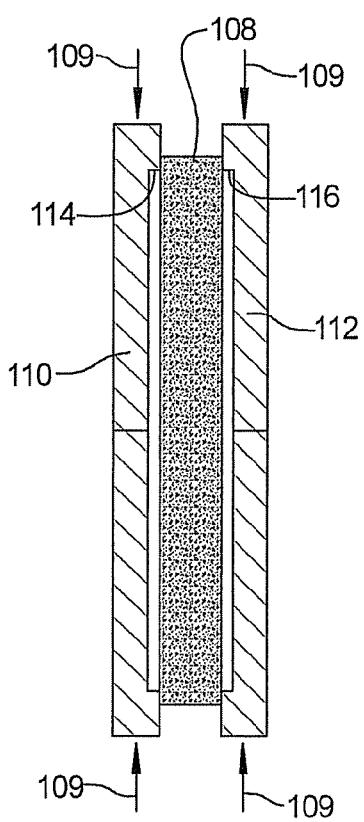
FIG. 5 is a side view of the gear of FIG. 4 being held in a tool while the resin fibrous material wrapped thereover is curing.

Referring to FIG. 4, a gear 100 in accordance with another embodiment of the present disclosure is shown. The gear 100 in this example forms a ring gear having a base portion 102 and a plurality of teeth 104 that extend radially inwardly. On an outer surface 106 is wrapped a resin fibrous material layer 108 that applies a compressive, radially inwardly directed stress at a root portion 106 of each tooth 104. The gear 100 is manufactured in accordance with the methodology described above for the gear 10. FIG. 5 illustrates one possible way of applying the compressive force to the gear 100. Two collets 110 and 112 are adapted to engage peripheral edges of 114 and 116, respectively, of the gear 100 and to apply radially inwardly directed compressive forces, indicated by arrows 109, at the radial edges 114 and 116 of the gear 100. A space exists between the collets 110 and 112 in which a resin fibrous material may be wound over the gear 10 outer surface to form resin fibrous material layer 108.

Figure 6:
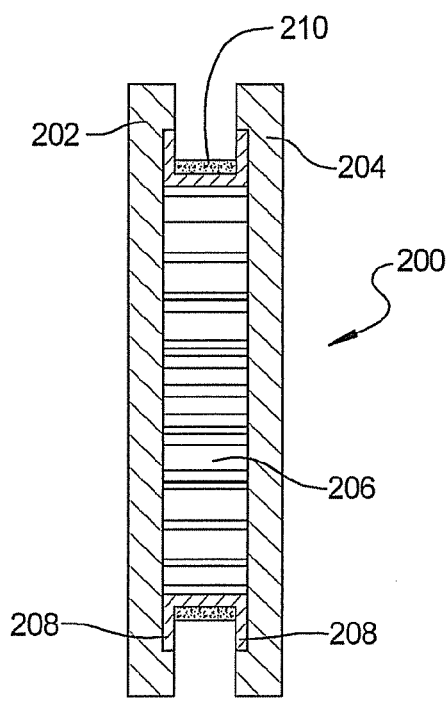
FIG. 6 is a cross-sectional side view of another gear of the present disclosure that has radially inwardly formed teeth on an inner diameter thereof, and also illustrating a tool fixture for compressing radial flanges of the gear while resin fibrous material wrapped on the outer surface is allowed to cure.

Referring to FIG. 6, a gear 200 is shown in accordance with another embodiment of the present disclosure, with the gear positioned within collets 202 and 204. The gear 200 in this example has radially inwardly projecting teeth 206 and a pair of flanges 208. The collets 202 and 204 are placed over the flanges 208 and compress the flanges 208, which induces a radially inwardly directed compressive stress on the gear 200.

A resin fibrous material layer 210 is formed on an outer peripheral surface of the gear 200 between the flanges 208. The compressive stress generated by the collets 202 and 204 on the flanges 208 is maintained while the material that will form material layer 210 is wrapped over an outer surface of the gear 200 between the flanges 208. Once the resin of the resin fibrous layers substantially cures and the collets 202 and 204 are removed, a permanent compressive stress is maintained by the resin fibrous layer 210.

Figure 7:
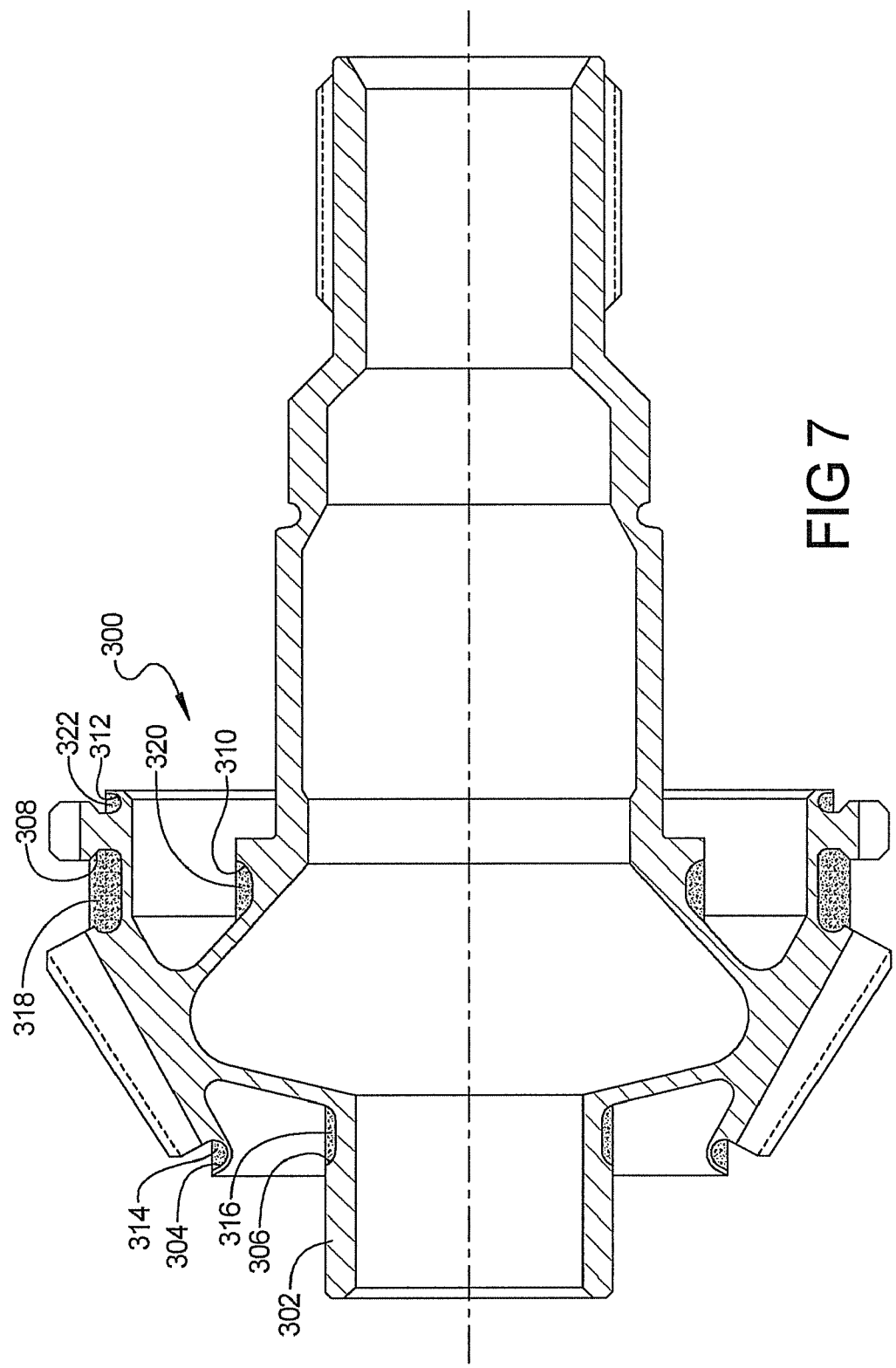
FIG. 7 is side cross-sectional side view of another embodiment of the present disclosure showing a bevel pinion gear incorporating a plurality of sections of wrapped resin fibrous material that serve to create compression stresses on the rim walls of the gear.

Referring to FIG. 7, a gear 300 in accordance with another embodiment of the present disclosure is shown. The gear 300 forms a bevel pinion gear having a body portion 302 with a plurality of grooves 304, 306, 308, 310 and 312 that may be wrapped with a corresponding plurality of resin fibrous material layers 314, 316, 318, 320 and 322. Thus, the methodology described herein is not limited to the use of only two resin fibrous material layers, but may be used to implement any desired number of resin fibrous material layers as may be needed depending on the construction of the gear that is being manufactured and the application in which it is expected to be used. In some instances, it may be desirable to implement three or more individual tools or collets in order to more directly apply the compressive stresses at specified locations on the gear.

Figure 8:
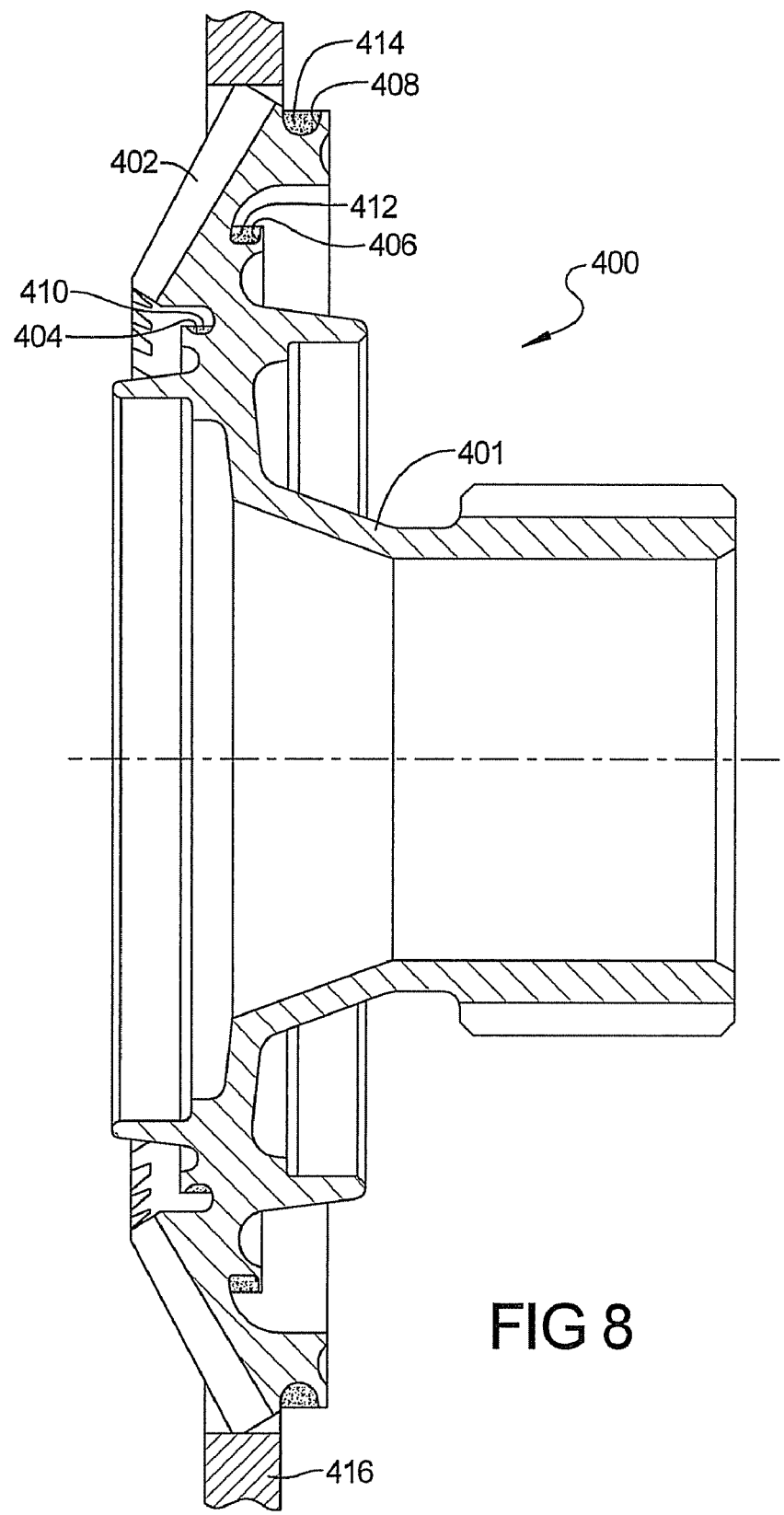
FIG. 8 is a cross-sectional side view of another embodiment of the present disclosure showing a bevel face gear incorporating a plurality of sections of wrapped resin fibrous material that serve to create compression stresses on various walls of the gear.

FIG. 8 illustrates a bevel face gear 400 having a base portion 401, a plurality of teeth 402 and three circumferential grooves 404, 406 and 408 formed adjacent the teeth 402. The grooves 404, 406 and 408 are wrapped with resin fibrous material layers 410, 412 and 414. A collet 416 is used to apply the compressive stress to the gear 400 by placing it directly over the small flat spots on the teeth 402.

It will be appreciated that while in most applications it is anticipated that the resin fibrous material described herein will be applied so as to exert a uniform compressive stress to the gear, it would also be possible to instead apply the compressive force in a non-uniform manner to the gear using a suitable tool. Such action would enable the gear to be formed with a small degree of predetermined deformation to counteract the expected forces that the gear may experience during use, which forces would tend to deform the gear during its normal use. For example, in many non-symmetrical applications such as secondary flight control rotary gear actuators used in jet aircraft applications, it may be beneficial to create compression not symmetrical in order to prevent deforming of the gear under the load.

Figure 9:
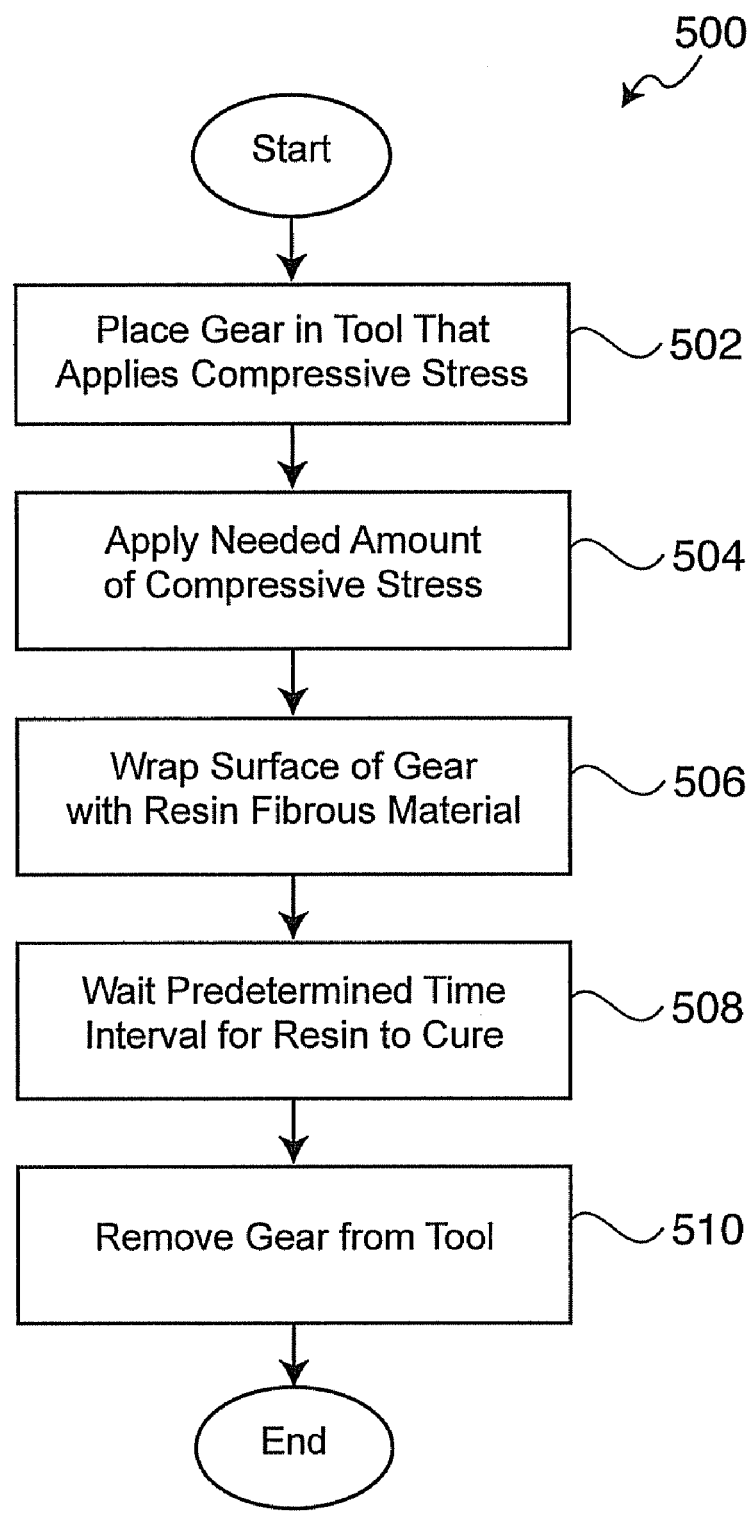
FIG. 9 is a flowchart of major operations performed in manufacturing a gear in accordance with one methodology described herein.

Referring to the flowchart 500 of FIG. 9, the various embodiments described herein may all be created using the following operations. At operation 502, the gear is first placed in a suitable tool that can apply the needed compressive stress to the gear. At operation 504, the tool is used to apply the desired amount of compressive force to the gear. At operation 506, while the compressive stress is being maintained, the gear is wrapped with resin fibrous material at one or more predetermined locations thereon. At operation 508, a predetermined time interval is allowed to pass for the resin of the fibrous material to substantially cure. At operation 510, the gear is then removed from the tool.

The various embodiments and methodologies described herein all enable a compressive stress to be introduced into a gear during a manufacturing operation at the root of each tooth of the gear. The compressive stress (or stresses) counteracts the tension stress that is experienced at the root areas of the gear during its use, and thus significantly strengthens the teeth of the gear. The composite gear construction described herein enables a gear to be constructed with less metallic material, and thus with less weight, than previously possible. In many aerospace and aircraft applications, where a large plurality of various types of gears may be employed, the weight savings can be significant (i.e., on the order of possibly 300 lbs (136 kg) for a wide body commercial passenger jet aircraft, and possibly about 200 lbs (90 kg) for a large rotorcraft).

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of forming a gear, comprising:
providing a gear having a plurality of teeth, with each said tooth having a root portion;
applying a circumferential force to said gear that is directed radially inwardly relative to an axial center of said gear, to effectively generate a compressive stress on said gear at said root portion of each said tooth;
while said circumferential force is being applied, wrapping a circumferential portion of said gear adjacent said teeth with a resin impregnated fiber reinforcing material;
maintaining said circumferential force on said gear while said resin of said resin impregnated fiber reinforcing material cures, to thus enable said compressive stress to be maintained after said circumferential force is removed from said gear; and
when said resin impregnated fiber reinforcing material cures, releasing said circumferential force.

2. The method of claim 1, wherein wrapping said circumferential portion of said gear comprises wrapping said circumferential portion with a resin impregnated fibrous material comprised of glass fibers.

3. The method of claim 1, wherein wrapping said circumferential portion of said gear comprises wrapping said circumferential portion with a resin impregnated fibrous material comprised of KEVLAR® fibrous material.

4. The method of claim 1, wherein wrapping said circumferential portion of said gear comprises wrapping said circumferential portion with a resin impregnated fibrous material comprised of boron fibers.

5. The method of claim 1, wherein wrapping said circumferential portion of said gear comprises wrapping said circumferential portion with a resin impregnated fibrous material comprised of carbon fibers.

6. The method of claim 1, wherein the circumferential force applied to the gear comprises a force equivalent to approximately sixty percent of the yield stress of the gear.

7. The method of clam 1, wherein wrapping said resin impregnated fibrous material around a circumferential portion of said gear comprises wrapping said resin impregnated fibrous material around an external surface of said gear that is axially aligned with said teeth.

8. The method of claim 1, wherein wrapping said resin impregnated fibrous material around a circumferential portion of said gear comprises wrapping said resin impregnated fibrous material around a circumferential portion of said gear that is axially offset from said teeth.

9. The method of claim 1, wherein wrapping said resin impregnated fibrous material on said gear comprises wrapping said material on a gear having said teeth projecting towards said axial center of said gear.

10. The method of claim 1, wherein wrapping said resin impregnated fibrous material on said gear comprises wrapping said material on a gear having said teeth projecting radially outwardly away from said axial center of said gear.

11. A method of toughening a gear, wherein said gear has a plurality of teeth, the method comprising:

applying a circumferential force to said gear that is directed radially inwardly relative to an axial center of said gear, to effectively generate a compressive stress on said gear at a root portion adjacent each said tooth;

while said circumferential force is being applied, wrapping a circumferential portion of said gear adjacent said teeth with a resin impregnated fiber reinforcing material; and maintaining said circumferential force on said gear while said resin of said resin impregnated fiber reinforcing material cures, to thus enable said compressive stress to be maintained after said circumferential force is removed from said gear.

12. The method of claim 11, further comprising releasing said circumferential force when said resin impregnated fiber reinforcing material cures.

13. The method of claim 11, wherein wrapping said circumferential portion of said gear comprises wrapping said circumferential portion with a resin impregnated fibrous material comprised of glass fibers.

14. The method of claim 11, wherein wrapping said circumferential portion of said gear comprises wrapping said circumferential portion with a resin impregnated fibrous material comprised of KEVLAR® fibrous material.

15. The method of claim 11, wherein wrapping said circumferential portion of said gear comprises wrapping said circumferential portion with a resin impregnated fibrous material comprised of boron fibers.

16. The method of claim 11, wherein wrapping said circumferential portion of said gear comprises wrapping said circumferential portion with a resin impregnated fibrous material comprised of carbon fibers.

17. The method of claim 11, wherein wrapping said circumferential portion of said gear comprises wrapping said resin impregnated fibrous material into a groove formed on said gear axially adjacent said teeth of said gear.

18. The method of claim 11, wherein wrapping said circumferential portion of said gear comprises wrapping said resin impregnated fibrous material over a surface of said gear that is axially aligned with said teeth of said gear.

* * * * *